(12) United States Patent
Elias

(10) Patent No.: US 8,126,029 B2
(45) Date of Patent: Feb. 28, 2012

(54) VOICE INTERFERENCE CORRECTION FOR MIXED VOICE AND SPREAD SPECTRUM DATA SIGNALING

(75) Inventor: Eric Elias, Somerville, MA (US)

(73) Assignee: Polycom, Inc., Pleasonton, CA (US)

( * ) Notice: Subject to any disclaimer, the term of this patent is extended or adjusted under 35 U.S.C. 154(b) by 1991 days.

(21) Appl. No.: 11/148,087

(22) Filed: Jun. 8, 2005

(65) Prior Publication Data

US 2006/0282184 A1 Dec. 14, 2006

(51) Int. Cl.
*H04B 1/00* (2006.01)

(52) U.S. Cl. ........ 375/140; 375/144; 375/220; 375/222; 375/296; 375/308; 375/346

(58) Field of Classification Search ........... 375/140, 375/144, 220, 222, 296, 308, 346
See application file for complete search history.

(56) References Cited

U.S. PATENT DOCUMENTS

| | | |
|---|---|---|
| 6,312,767 B2 | 6/1969 | Lincroft |
| 3,573,377 A | 4/1971 | Anderson et al. |
| 3,612,767 A | 10/1971 | Anderson et al. |
| 3,649,761 A | 3/1972 | Bush |
| 3,854,010 A | 12/1974 | Yoshino et al. |
| 3,927,269 A | 12/1975 | Yoshino et al. |
| 4,008,376 A | 2/1977 | Flanagan et al. |
| 4,058,769 A | 11/1977 | Alderman |
| 4,257,119 A | 3/1981 | Pitroda |
| 4,311,877 A | 1/1982 | Kahn |
| 4,351,062 A | 9/1982 | Yoshiya |
| 4,384,362 A | 5/1983 | Leland |
| 4,425,642 A | 1/1984 | Moses et al. |
| 4,541,118 A | 9/1985 | Eastmond et al. |
| 4,544,804 A | 10/1985 | Herr et al. |
| 4,763,317 A | 8/1988 | Lehman et al. |
| 4,782,521 A | 11/1988 | Bartlett et al. |
| 4,796,293 A | 1/1989 | Blinken et al. |
| 4,901,307 A | 2/1990 | Gilhousen et al. |
| 4,945,412 A | 7/1990 | Kramer |
| 4,995,071 A | 2/1991 | Weber et al. |

(Continued)

FOREIGN PATENT DOCUMENTS

EP 0 669 749 A1 8/1995

(Continued)

OTHER PUBLICATIONS

Hering, et al.; "Safety and Security Increase for Air Traffic Management Through Unnoticeable Watermark Aircraft Identification Tag Transmitted with the VHF Voice Communication;" pp. 1-10; © 2003 IEEE.

(Continued)

*Primary Examiner* — Kabir A Timory
(74) *Attorney, Agent, or Firm* — Wong, Cabello, Lutsch, Rutherford & Brucculeri, LLP

(57) ABSTRACT

A method, a process and an audio system for embedding bit stream in a voice signal is disclosed. A voice/data interference signal is composed and supplied to the mixer of the voice signal and the data signal such that the resulting mixed signal effectively cancels the interference and allows the interference-free signal being transmitted to the audio signal receiver/decoder. The decoder may decode the data without interference errors. A method using profile shaping to mask the noise due to modulated carrier signal is also disclosed.

23 Claims, 10 Drawing Sheets

U.S. PATENT DOCUMENTS

| | | | |
|---|---|---|---|
| 5,003,593 A | 3/1991 | Mihm, Jr. | |
| 5,007,049 A | 4/1991 | Ohtsuka | |
| 5,155,743 A * | 10/1992 | Jacobs | 375/247 |
| 5,157,689 A | 10/1992 | Kurihara | |
| 5,195,087 A | 3/1993 | Bennett et al. | |
| 5,276,704 A * | 1/1994 | Dixon | 375/142 |
| 5,353,373 A | 10/1994 | Drogo de Iacovo et al. | |
| 5,434,913 A | 7/1995 | Tung et al. | |
| 5,473,631 A | 12/1995 | Moses | |
| 5,526,354 A | 6/1996 | Barraclough et al. | |
| 5,530,699 A | 6/1996 | Kline | |
| 5,572,247 A | 11/1996 | Montgomery et al. | |
| 5,583,963 A | 12/1996 | Lozach | |
| 5,598,429 A | 1/1997 | Marshall | |
| 5,625,407 A | 4/1997 | Biggs et al. | |
| 5,677,728 A | 10/1997 | Schoolman | |
| 5,687,095 A | 11/1997 | Haskell et al. | |
| 5,724,383 A | 3/1998 | Gold et al. | |
| 5,724,416 A | 3/1998 | Foladare et al. | |
| 5,758,079 A | 5/1998 | Ludwig | |
| 5,760,824 A | 6/1998 | Hicks, III | |
| 5,761,239 A | 6/1998 | Gold et al. | |
| 5,761,292 A | 6/1998 | Wagner et al. | |
| 5,790,591 A | 8/1998 | Gold et al. | |
| 5,790,652 A | 8/1998 | Gulley et al. | |
| 5,822,360 A * | 10/1998 | Lee et al. | 375/140 |
| 5,835,129 A | 11/1998 | Kumar | |
| 5,841,763 A | 11/1998 | Leondires et al. | |
| 5,844,600 A | 12/1998 | Kerr | |
| 5,855,502 A | 1/1999 | Truchsess | |
| 5,886,734 A | 3/1999 | Ozone et al. | |
| 5,894,321 A | 4/1999 | Downs et al. | |
| 5,914,940 A | 6/1999 | Fukuoka et al. | |
| 5,916,302 A | 6/1999 | Dunn et al. | |
| 5,943,337 A | 8/1999 | Sasagawa | |
| 5,950,125 A | 9/1999 | Buhrmann et al. | |
| 5,963,246 A | 10/1999 | Kato | |
| 5,983,192 A | 11/1999 | Botzko et al. | |
| 5,983,261 A | 11/1999 | Riddle | |
| 5,991,385 A | 11/1999 | Dunn et al. | |
| 5,999,207 A | 12/1999 | Rodriguez et al. | |
| 5,999,966 A | 12/1999 | McDougall et al. | |
| 6,049,531 A | 4/2000 | Roy | |
| 6,088,347 A | 7/2000 | Minn et al. | |
| 6,088,368 A | 7/2000 | Rubinstain et al. | |
| 6,094,213 A | 7/2000 | Mun et al. | |
| 6,108,327 A | 8/2000 | Schilling et al. | |
| 6,111,936 A | 8/2000 | Bremer | |
| 6,122,259 A | 9/2000 | Ishida | |
| 6,130,880 A | 10/2000 | Naudus et al. | |
| 6,134,223 A | 10/2000 | Burke et al. | |
| 6,148,068 A | 11/2000 | Lowery et al. | |
| 6,151,578 A | 11/2000 | Bourcet et al. | |
| 6,154,484 A * | 11/2000 | Lee et al. | 375/130 |
| 6,154,524 A | 11/2000 | Bremer | |
| 6,170,011 B1 | 1/2001 | Macleod Beck et al. | |
| 6,178,237 B1 | 1/2001 | Horn | |
| 6,185,285 B1 | 2/2001 | Relyea et al. | |
| 6,192,395 B1 | 2/2001 | Lerner et al. | |
| 6,201,859 B1 | 3/2001 | Memhard et al. | |
| 6,202,084 B1 | 3/2001 | Kumar et al. | |
| 6,208,372 B1 | 3/2001 | Barraclough | |
| 6,230,197 B1 | 5/2001 | Beck et al. | |
| 6,236,854 B1 | 5/2001 | Bradshaw, Jr. | |
| 6,262,978 B1 | 7/2001 | Bruno et al. | |
| 6,272,176 B1 | 8/2001 | Srinivasan | |
| 6,301,339 B1 | 10/2001 | Staples et al. | |
| 6,327,567 B1 | 12/2001 | Willehadson et al. | |
| 6,332,006 B1 | 12/2001 | Rydbeck et al. | |
| 6,345,047 B1 | 2/2002 | Regnier | |
| 6,366,570 B2 | 4/2002 | Bhagalia | |
| RE37,802 E | 7/2002 | Fattouche et al. | |
| 6,421,355 B1 | 7/2002 | Quiring et al. | |
| 6,442,190 B1 | 8/2002 | Nguyen | |
| 6,442,272 B1 | 8/2002 | Osovets | |
| 6,453,022 B1 | 9/2002 | Weinman, Jr. | |
| 6,453,336 B1 | 9/2002 | Beyda et al. | |
| 6,501,739 B1 | 12/2002 | Cohen | |
| 6,501,740 B1 | 12/2002 | Sun et al. | |
| 6,526,385 B1 | 2/2003 | Kobayashi et al. | |
| 6,553,062 B1 | 4/2003 | Marum | |
| 6,580,789 B1 | 6/2003 | Simpson et al. | |
| 6,584,138 B1 | 6/2003 | Neubauer et al. | |
| 6,597,667 B1 | 7/2003 | Cerna | |
| 6,628,644 B1 | 9/2003 | Nelson et al. | |
| 6,628,768 B1 | 9/2003 | Ramaswamy et al. | |
| 6,661,833 B1 | 12/2003 | Black et al. | |
| 6,671,263 B1 | 12/2003 | Potter et al. | |
| 6,728,222 B1 | 4/2004 | Ono | |
| 6,728,367 B1 | 4/2004 | Swam | |
| 6,731,609 B1 | 5/2004 | Hirni et al. | |
| RE38,523 E | 6/2004 | Ozluturk | |
| 6,765,895 B1 | 7/2004 | Watanabe | |
| 6,792,092 B1 | 9/2004 | Michalewicz | |
| 6,798,753 B1 | 9/2004 | Doganata et al. | |
| 6,807,563 B1 | 10/2004 | Christofferson et al. | |
| 6,810,116 B1 | 10/2004 | Sorensen et al. | |
| 6,812,955 B2 | 11/2004 | Takaki et al. | |
| 6,885,652 B1 | 4/2005 | Ozukturk et al. | |
| 6,888,935 B1 | 5/2005 | Day | |
| 6,898,620 B1 | 5/2005 | Ludwig et al. | |
| 6,931,113 B2 | 8/2005 | Ortel | |
| 6,940,826 B1 | 9/2005 | Simard et al. | |
| 6,978,001 B1 | 12/2005 | Shaffer et al. | |
| 7,003,042 B2 | 2/2006 | Morelos-Zaragoza et al. | |
| 7,006,456 B2 | 2/2006 | Rabipour et al. | |
| 7,006,616 B1 | 2/2006 | Christofferson et al. | |
| 7,007,235 B1 | 2/2006 | Hussein et al. | |
| 7,099,448 B1 | 8/2006 | Laniepce et al. | |
| 7,099,949 B1 * | 8/2006 | Vanhoof et al. | 709/230 |
| 7,107,312 B2 | 9/2006 | Hackbarth et al. | |
| 7,185,054 B1 | 2/2007 | Ludwig et al. | |
| 7,221,663 B2 | 5/2007 | Rodman et al. | |
| 7,227,938 B2 | 6/2007 | Rodman et al. | |
| 7,302,050 B1 | 11/2007 | Michalewicz | |
| 7,317,791 B2 | 1/2008 | Carlson | |
| 7,339,605 B2 | 3/2008 | Rodman et al. | |
| 7,366,907 B1 | 4/2008 | Ezaki | |
| 7,386,026 B1 | 6/2008 | Gold | |
| 7,428,223 B2 | 9/2008 | Nierhaus et al. | |
| 7,519,098 B2 | 4/2009 | Schilling | |
| 7,526,078 B2 | 4/2009 | Rodman et al. | |
| 7,633,996 B2 | 12/2009 | Haentzschel et al. | |
| 7,689,568 B2 | 3/2010 | Lee et al. | |
| 7,814,150 B1 | 10/2010 | Sonnenfeldt et al. | |
| 2001/0008556 A1 | 7/2001 | Bauer et al. | |
| 2001/0016038 A1 | 8/2001 | Sammon et al. | |
| 2001/0033613 A1 | 10/2001 | Vitenberg | |
| 2001/0043571 A1 | 11/2001 | Jang et al. | |
| 2002/0018117 A1 | 2/2002 | Tosaya | |
| 2002/0034166 A1 | 3/2002 | Barany et al. | |
| 2002/0071026 A1 | 6/2002 | Agraharam et al. | |
| 2002/0083462 A1 | 6/2002 | Arnott | |
| 2002/0093985 A1 | 7/2002 | Nimmagadda | |
| 2002/0097679 A1 | 7/2002 | Berenbaum | |
| 2002/0122429 A1 | 9/2002 | Griggs | |
| 2002/0131377 A1 | 9/2002 | DeJaco et al. | |
| 2002/0151294 A1 | 10/2002 | Kirby et al. | |
| 2002/0188731 A1 | 12/2002 | Potekhin et al. | |
| 2003/0016676 A1 | 1/2003 | Allen et al. | |
| 2003/0048353 A1 | 3/2003 | Kenoyer et al. | |
| 2003/0053443 A1 | 3/2003 | Owens | |
| 2003/0072429 A1 | 4/2003 | Slobodin et al. | |
| 2003/0091244 A1 | 5/2003 | Schnee et al. | |
| 2003/0112947 A1 | 6/2003 | Cohen | |
| 2003/0114122 A1 | 6/2003 | Strakovsky | |
| 2003/0123645 A1 | 7/2003 | Comisky | |
| 2003/0142635 A1 | 7/2003 | Roher et al. | |
| 2003/0179859 A1 | 9/2003 | Chea et al. | |
| 2004/0003045 A1 | 1/2004 | Tucker et al. | |
| 2004/0012669 A1 | 1/2004 | Drell et al. | |
| 2004/0022272 A1 | 2/2004 | Rodman et al. | |
| 2004/0125932 A1 | 7/2004 | Orbach et al. | |
| 2004/0213474 A1 | 10/2004 | Kato | |
| 2005/0014491 A1 | 1/2005 | Johnson | |
| 2005/0018756 A1 | 1/2005 | Nuytkens et al. | |
| 2005/0149876 A1 | 7/2005 | Kortum et al. | |

| | | | |
|---|---|---|---|
| 2005/0157777 A1 | 7/2005 | Mizuno | |
| 2005/0185602 A1 | 8/2005 | Simard et al. | |
| 2005/0206721 A1 | 9/2005 | Bushmitch et al. | |
| 2005/0207554 A1 | 9/2005 | Ortel | |
| 2005/0212908 A1 | 9/2005 | Rodman et al. | |
| 2005/0213517 A1 | 9/2005 | Rodman et al. | |
| 2005/0213725 A1 | 9/2005 | Rodman | |
| 2005/0213726 A1 | 9/2005 | Rodman | |
| 2005/0213728 A1 | 9/2005 | Rodman et al. | |
| 2005/0213729 A1 | 9/2005 | Rodman et al. | |
| 2005/0213730 A1 | 9/2005 | Rodman et al. | |
| 2005/0213731 A1 | 9/2005 | Rodman et al. | |
| 2005/0213732 A1 | 9/2005 | Rodman | |
| 2005/0213733 A1 | 9/2005 | Rodman et al. | |
| 2005/0213734 A1 | 9/2005 | Rodman | |
| 2005/0213735 A1 | 9/2005 | Rodman et al. | |
| 2005/0213736 A1 | 9/2005 | Rodman et al. | |
| 2005/0213737 A1 | 9/2005 | Rodman et al. | |
| 2005/0213738 A1 | 9/2005 | Rodman et al. | |
| 2005/0213739 A1 | 9/2005 | Rodman et al. | |
| 2005/0232166 A1 | 10/2005 | Nierhaus | |
| 2005/0254558 A1 | 11/2005 | Dutka | |
| 2005/0271194 A1 | 12/2005 | Woods et al. | |
| 2005/0281319 A1 | 12/2005 | Schilling | |
| 2006/0098692 A1 | 5/2006 | D'Angelo | |
| 2006/0109890 A1 | 5/2006 | Willenegger | |
| 2006/0222155 A1 | 10/2006 | Summers et al. | |
| 2008/0144701 A1 | 6/2008 | Gold | |
| 2009/0132391 A1 | 5/2009 | Jacobs | |

FOREIGN PATENT DOCUMENTS

| | | |
|---|---|---|
| EP | 0 680 190 | 11/1995 |
| EP | 1 006 706 | 7/2003 |
| JP | 05300509 | 12/1993 |
| JP | 08125738 | 5/1996 |
| JP | 10042264 | 2/1998 |
| RU | 2 096 921 | 11/1997 |
| WO | 94/18779 | 8/1994 |
| WO | 98/19458 | 5/1998 |
| WO | 99/12351 | 3/1999 |

OTHER PUBLICATIONS

International Search Report received in corresponding International Application No. PCT/US02/41778 dated Jul. 17, 2003.
Search Report received in corresponding European Application No. 03743750.6-2414—PCT/US0306698 dated Mar. 16, 2005.
Search Report received in corresponding European Application No. 03726026.2-2414—US0306736 dated Mar. 10, 2005.
International Search Report received in corresponding International Application No. PCT/US01/51636 dated Sep. 26, 2002.
Mermeistein P.; "G.722, A New CCITT CCITT Coding Standard for Digital Transmission of Wideband Audio Signals;" IEEE Communications Magazine; 26(1) Jan. 1988; pp. 8-15.
Mermeistein; "G.722, A New CCIT Coding Standard for Digital Transmission of Wideband Audio Signals;" IEEE Communications Magazine; Jan. 1988—vol. 26, No. 1.
Schulzrinne; "Voice Communication Across the Internet: A Network Voice Terminal;" 1992, pp. 1-34, Amherst, MA.
Haojun; "Implementing an Audio Multipoint Processor on DSP Array;" 2001, pp. 441-444.
Jung; "The Multimedia Desktop Conference System Adaptability in Network Traffic on LAN;" 1995; pp. 334-338, IEEE.
Noore; "Computer-Based Multimedia Video Conferencing System;" 1993; pp. 587-591.
Sasse; "Workstation-Based Multimedia Conferencing: Experiences from the MICE Project;" 1994; pp. 1-6.
User's Guide Adminstrator's guide, SoundStation(R) VTX 1000 Operation Manual, (c)2003 Polycom, Inc.
Quick Installation Guide, Vortex(R)—Soundstation VTX 1000TM, (c)2004, Polycom, Inc.
J. Rodman, Polycom(R), White Paper—"The Power of Shared Resources: Conference Room Integration in the VTX/VSX Environment" Jun. 2, 2004, pp. 1-6.
J. Rodman, Polycom(R), White Paper—"The Distributed Dawn: the Emergence of Versatile Performance in the Conferencing Environment" Jun. 2, 2004, pp. 1-7.
H324 Videophones Standard; http://www.elextronika.com/tvphone/h324.htm; Retrieved Mar. 14, 2005; 4 pages.
International Telecommunication Union; ITU-T Telecommunication Standardization Sector of ITU H.234 (Mar. 2002) Series H: Audiovisual and Multimedia Systems Infrastructure of Audiovisual services—Systems and terminal equipment for audiovisual services Terminal for low bit-rate multimedia Communication; ITU-T Recommendation H.324.
MultiTech(R) Systems; MultiModemDSVD Compact DSVD Modems; http://www.multitech.com/Products/Families/MultiModernDSVD; obtained Mar. 14, 2005.
DSVD and H324 Standards; TechOnLine—Modern and Fax Standards and Software; http://www.techonline.com/community/ed_resource/feature_article/20041; Obtained Mar. 24, 2005.
Hering, et al.; "Safety and Security Increases for Air Traffic Management Through Unnoticeable Watermark Aircraft Identification Tag Transmitted with VHF Voice Communication" pp. 1-10; © 2003 IEEE.
CDMA Overview, Resources/Tutorials; http://www.telecomspace.com/cdma.html; Retrieved Sep. 24, 2006; 5 pages.
Spread spectrum—Wikipedia, the free encyclopedia; http://en.wikipedia.org/wiki/Spread_spectrum; retrieved Sep. 24, 2006; 4 pages.
Search Report received in corresponding European Application No. EP 02 72 8007 dated Sep. 26, 2006.

* cited by examiner

VOICE INTERFERENCE CORRECTION FOR MIXED VOICE AND SPREAD SPECTRUM DATA SIGNALING

CROSS-REFERENCE TO RELATED APPLICATIONS

This application is related to a patent application titled "System and method for communicating data during an audio conference," by Jeffrey Rodman and David Drell, assigned to the same assignee, Ser. No. 10/378,709, filed on May 3, 2003, which was a Continuation-in-Part of an application Ser. No. 10/335,108 filed on Dec. 31, 2002, which claimed priority of a provisional patent application, Ser. No. 60/360,984, filed on May 1, 2002.

BACKGROUND OF THE INVENTION

1. Field of the Invention

This invention relates to embedding digital data in an audio signal, especially related to methods and apparatuses to reduce error rates in the digital data recovery and to reduce the perception of noise in the audio signal.

2. Description of the Related Art

Using audible sound to transmit information is as old as human speech. When one speaks, the speaker is conveying information to his human listener. Using audible sound to transmit digitized information came somewhat later but it can be traced back at least to the days when people communicated using Morse code through telegraphy. In the recent years of the computer age, audio signals are also used for communicating digitized data through computer network. For example, Plain Old Telephone Service, or POTS has been used to transmit digital information using modulators and demodulators (modems). Most of the time, though, an audio channel is either used to communicate human speech, i.e. analog speech signals which are comprehensible to humans, or to communicate digitized information which is comprehensible to computers, but not both at the same time.

DSL (Digital Subscriber's Line) technology may look like an exception. Using DSL technology, a single traditional copper telephone line may transmit both digital data and voice signals at the same time. But the digital data and the voice signals are transmitted at quite different frequency bands carried by the same telephone line. The digital information is carried by high frequency signals and the analog voice signals are carried by low frequency electric waves with frequencies typically lower than about 4000 Hz. The DSL technology has a big limitation in terms of distance. A subscriber of the DSL service has to be within a short distance, e.g. three miles, from the service provider's server.

More recently, using various techniques, analog audio speech and digital data are transmitted simultaneously and commingled together, as illustrated in FIG. 1 and as described in more detail in a related patent application Ser. No. 10/378,709, filed on May 3, 2003. For simplicity, only the signal path from left to right is discussed here. The signal path from right to left is the same. A generic system 100 shown in FIG. 1 includes an ordinary audio conference system having units 102, 143 and 142 connected through a usual Plan Old Telephone System (POTS) network 122. In addition to the regular voice conference, this system 100 can also transmit digital data. Data source 104 (typically a computer) at the near end site can transmit data 106, which are mixed with audio signal 136 by a data and voice mixer 112 to create a data signal embedded in the voice signal. The combined audio signal 154 is transmitted through the POTS network 122 to a far end site.

At a far end site, the mixed audio signal 156 can be separated by data and voice separator 132 into digital data 108 and voice signal 138. Digital data 108 goes into a data sink 144. Voice signal 138 goes to a voice sink 142, which is typically a speakerphone that can reproduce the sound of voice signal 138. In a far end that does not have a capable separator, mixed audio signal 156 can still be branched into a signal 139 and be reproduced by a voice sink 143, e.g. a speakerphone. To voice sink 143, mixed audio signal 139 is treated as if it is voice signal 136 and the data signal 106 is ignored. For conference participants using voice sink 143, the embedded data does not exist because the sound due to the embedded data is substantially imperceptible.

FIG. 1 shows the functional block diagram of audio system 100. For clarity, the data source (sink) and voice source (sink) are shown as separate entities and only one for each is shown. In actual implementation, more than one of each, data source, data sink, voice source or voice sink, may be present in a system. In many actual implementations, these different items may be the same physical entity that has multiple functionalities. In other implementations, the different functions, or their combinations, may be performed by different physical entities with the necessary interfaces connecting them.

There are many ways to combine the digital data and voice signals together. For example, several methods are disclosed in a patent application entitled "System and method for communicating data during an audio conference," by Jeffrey Rodman and David Drell, filed on Mar. 3, 2003, Ser. No. 10/378,709, assigned to the same assignee as the current application, which is incorporated by reference herein. In that patent application, digital data is received from a data source. The digital data is then modulated onto an audio carrier signal which is an analog audio signal. That audio carrier signal is mixed with a regular speech signal to form an audio signal for transmission, recording or other further processing. The audio carrier signal can be a notched narrow-band audio tone or a spread spectrum audio carrier signal, which is a signal covering a wide audio spectrum. In some other cases, the carrier signal can be a narrow-band spectrum, but the frequency is hopping throughout a wide audio spectrum (signal hopping). In such a system, data and speech are transmitted simultaneously, in the same medium and same frequency spectrum range. For a human listener, only the speech portion of the signal is generally perceptible. The data portion is unknown to the listener. The data portion is imperceptible and masked by the speech portion or perceived as background noise when the audio channel is noisy. The data can be obtained only if there is a decoder at the receiver.

FIG. 2 illustrates another way of encoding/modulating digital data into audio signal, which is called Phase Shifting Keying (PSK). An audio tone 226, shown as a sine wave, is used to encode the digital data in a bit stream 222. Bit stream 222 is fed into a modulator/encoder 224 to be combined with audio carrier signal 226. The output from the modulator/encoder is an audio signal u(t) 228. What modulator 224 does is to change the phase of sine wave 226 according to bit signal 222: when the bit is a 1 then the phase is 0, or when the bit is 0 then the phase is 180°. The phase of the encoded sine wave indicates the digital data as 1 or 0. In the time domain, the corresponding bit stream is represented by a step curve 212 and the encoded carrier wave is shown as wave 214. The same modulation is also shown in the frequency domain, where the initial bit stream is shown as a curve 202, which is centered at the zero frequency or DC, while the encoded carrier signal is shown as a curve 204, which is centered at the audio carrier frequency Fc. On the receiver side, transmit signal u(t) 228 becomes a received signal x(t) 238. It is demodulated at demodulator 234 with audio carrier signal 226, which is same as the one used in modulator 224. Passing demodulated signal 236 through a Low Pass Filter 244, a bit stream 242 can be retrieved, which is the same as the original bit stream B(n) 222.

An audio system which can transmit additional data has many different uses. As in the cited patent application, such additional data are related to the ongoing audio conference or video conference calls. The data can be used by the conference equipment to automate many routine tasks, such as exchange parties' phone numbers, names etc; or remotely control related equipment, for example, adding a video portion of the conference call to make it a video conference call or transmitting a web address of an interested website.

The data embedded in the audio stream may also be used as a means for intellectual property right management, such as digital watermarks. It may also be used to as a watermark aircraft identification tag within voice communication between pilot and control tower, which can reduce errors in the communication between them.

In the most applications where digital data is embedded in audible signals, the digital data must have small amplitudes in order to avoid interference with the primary audible signals. Most of the time, the audio carrier signals with digital data are heard by people as "noises." The noise level has to be as low as possible. But with low audio carrier signal amplitude, the carrier signal is more susceptible to real noise. It may not have enough signal to noise ratio (SNR) to be decoded properly at the receiver. It is found that a typical system using the data-in-speech method, the data error rate is as high as 10% of the data transmitted. The data processing system has to use other methods to correct the transmission or decoding errors. For example, one may increase the redundancy of the data encoding, transmitting/encoding the same data over and over to ensure the correct reception and decoding.

It is desirable to reduce the error rate without adversely affecting the primary audible signal. It is desirable to increase the carrier signal amplitude without raising the perceived noise level in the primary speech or music signal.

BRIEF SUMMARY OF THE INVENTION

The current invention discloses methods and devices to avoid data errors due to the interference between the voice signals and data signals. A voice/data interference signal is composed and supplied to the mixer of the voice signal and the data signal such that the composed interference signal effectively cancels the actual interference and allows the interference-free signal to be transmitted to the audio signal receiver. The output of the decoder may be the original data without the interference error. After using the embodiments of the current invention, the data error rate can be reduced from about 10% of the data transmitted in a typical prior art system to virtually zero.

The current invention may also change the spread spectrum frequency profile, such that the data encoding carrier signal profile mimics the real time speech spectrum profile. In that way, the data encoding audio carrier signal can have much higher total energy but still with less perceived noise.

BRIEF DESCRIPTION OF THE SEVERAL VIEWS OF THE DRAWINGS

A better understanding of the invention can be had when the following detailed description of the preferred embodiments is considered in conjunction with the following drawings, in which.

DETAILED DESCRIPTION OF THE INVENTION

For most systems using audio signals to carry digital data, the following are some desirable properties and capabilities: 1) to share data across an audio channel, such as a POTS network, radio broadcast or music CD, 2) to make the noise associated with the additional data be below a perceptible level; 3) to make the system multi-user capable; and 4) to share the data reliably with low or no errors due to transmission or encoding/decoding.

It is found that one way to lower perceptibility of the noise associated with the additional data in the audio signal is to use spread spectrum. The spread spectrum method has been used in many other applications. It is generally regarded as robust against jamming and interference. It can be hidden and masked due to the low amplitude at any given frequency, and it is robust such that even if many channels are impaired, the overall signal can still go through. The spread spectrum can naturally support multi-user implementation, for example, it is used in the CDMA cellular telephone system.

Figure 2:
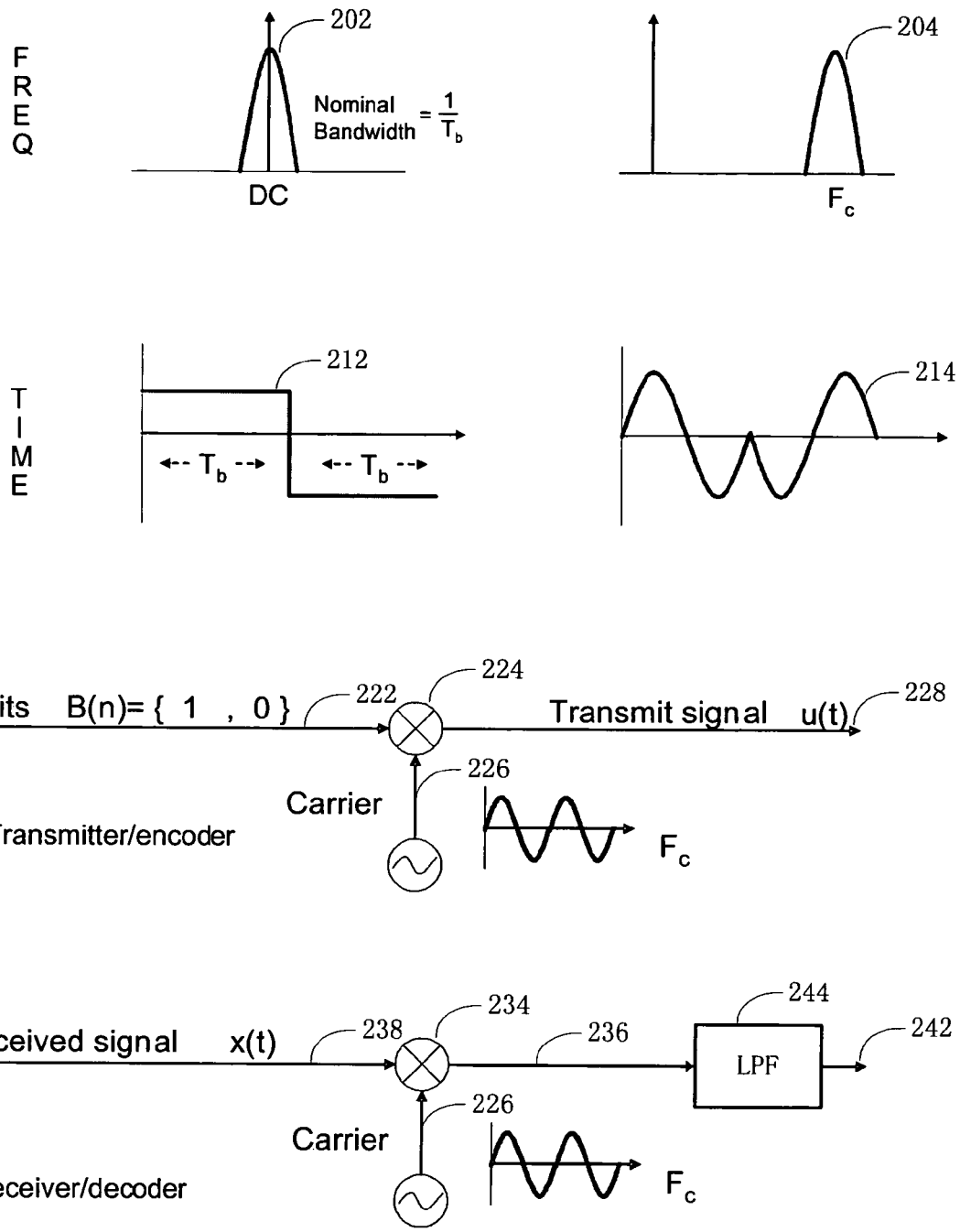
FIG. 2 shows a basic phase shifting keying (PSK) encoding scheme.
Figure 3:
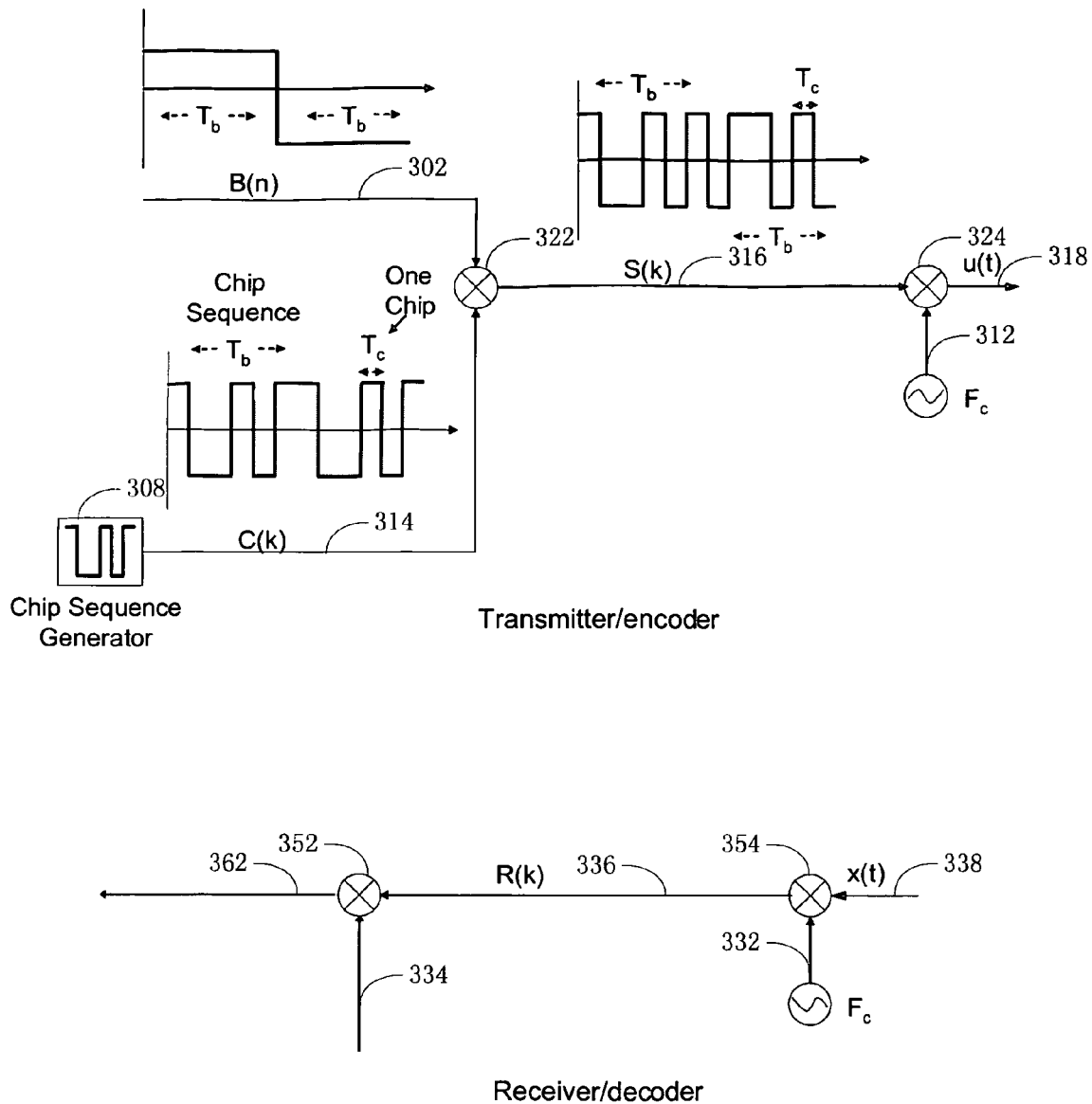
FIG. 3 shows a diagram for direct sequence spread spectrum.

FIG. 3 illustrates the direct sequence spread spectrum method. On the transmitter/encoder side, instead of using bit stream 302 to directly modulate carrier audio signal 312, the bit stream is XOR'ed by a chip sequence 314 at combiner 322. Chip sequence 314 is generated by chip sequence generator 308. It is a pseudo random bit stream at much higher frequency. In other words, the period $T_c$ of chip sequence 314 is much shorter than the period $T_b$ of bit stream 302, as illustrated in FIG. 3. The resulting sequence 316 from combiner 322 is then used as if it is the digital data to be encoded or modulated onto audio carrier signal 312. Modulator 324 is similar to modulator 224 as shown in FIG. 2. Modulated signal u(t) 318 can be transmitted for further processing. Any modulation methods, such as those discussed earlier in the prior art section can be employed to modulate digital data on an audio carrier signal. One method used in implementing the current invention is the Phase Shift Keying method.

On the receiver/decoder side, the process is similar to the transmitter/encoder side in a reversed order. A received signal x(t) 338, which is the same as transmitted signal u(t) 318, is demodulated with audio carrier signal 332 at demodulator 354. Demodulated signal 336 is then multiplied by chip sequence signal 334, which is the same as chip sequence 314, at a combiner 352. A retrieved bit stream 362 from combiner 352 should be essentially the same as the original bit stream 302.

Figure 4:
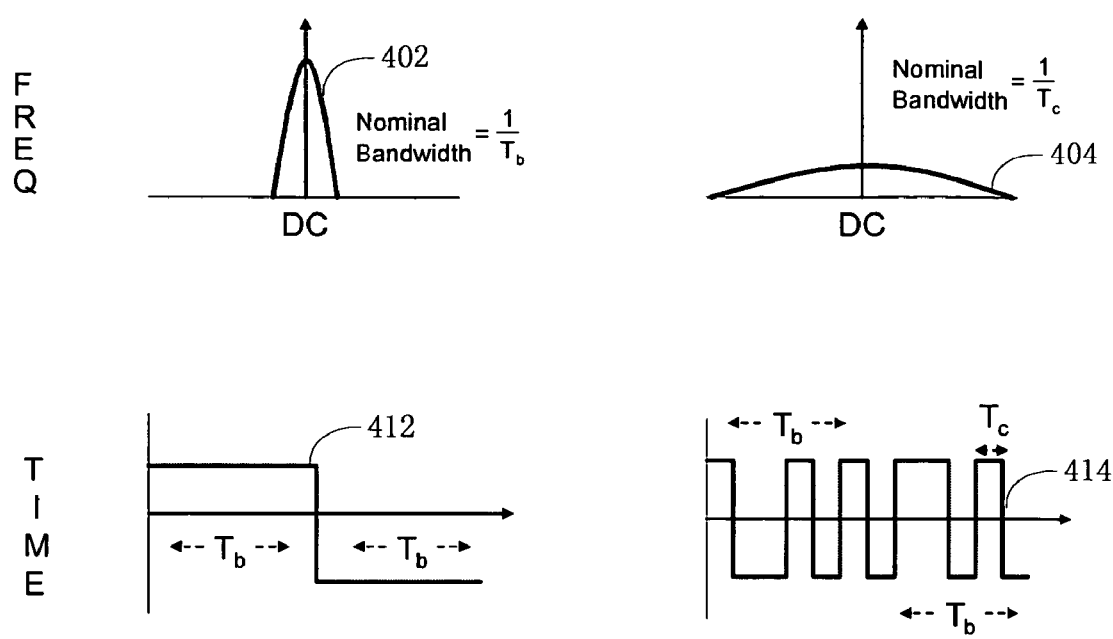
FIG. 4 shows the effect of spreading in frequency domain for the system as shown in FIG. 3.

FIG. 4 illustrates the effect of using the spread spectrum, namely spreading the original narrow spectrum to a wider spectrum. The original bit stream has a long period $T_b$ 412. The chip sequence has a much shorter period $T_c$ 414. It is well known that the bandwidth is proportional to the inverse of the period. When looking at the frequency domain, bandwidth 402 of the original bit stream is much narrower than chip sequence bandwidth 404. It has been confirmed in experiments that at the same bit stream error rates, the encoded signal using chip sequencing can have an amplitude that is as much as 17 dB less than the encoded signal when the chip sequence period $T_c$ is about 1/50 (i.e. −17 dB) of the original bit period $T_b$. Therefore, using chip sequencing and spread spectrum can greatly reduce the digital data noise, or greatly improve the digital data transmission accuracy at the similar noise level, or both.

The amount of data that can be transmitted through an audio channel depends on the bandwidth of the channel and the quality of the channel, in terms of SNR. A rule of thumb is that:

Bit rate=Ideal Bandwidth*$\log_2(SNR+1)$.

For example, if the ideal bandwidth is 4000 Hz, and the SNR=−13 dB, then the capacity of the channel, i.e. the bit rate is 282 bps.

In a typical practical system, the bit rate may be lower. Assuming useable bandwidth to be 2000 Hz, and SNR=−13 dB, with 6 dB allowance, then the bit rate is 36 bps, i.e. the audio channel may transmit 36 bits of information per second while it is also transmitting a normal audible signal.

Figure 5:
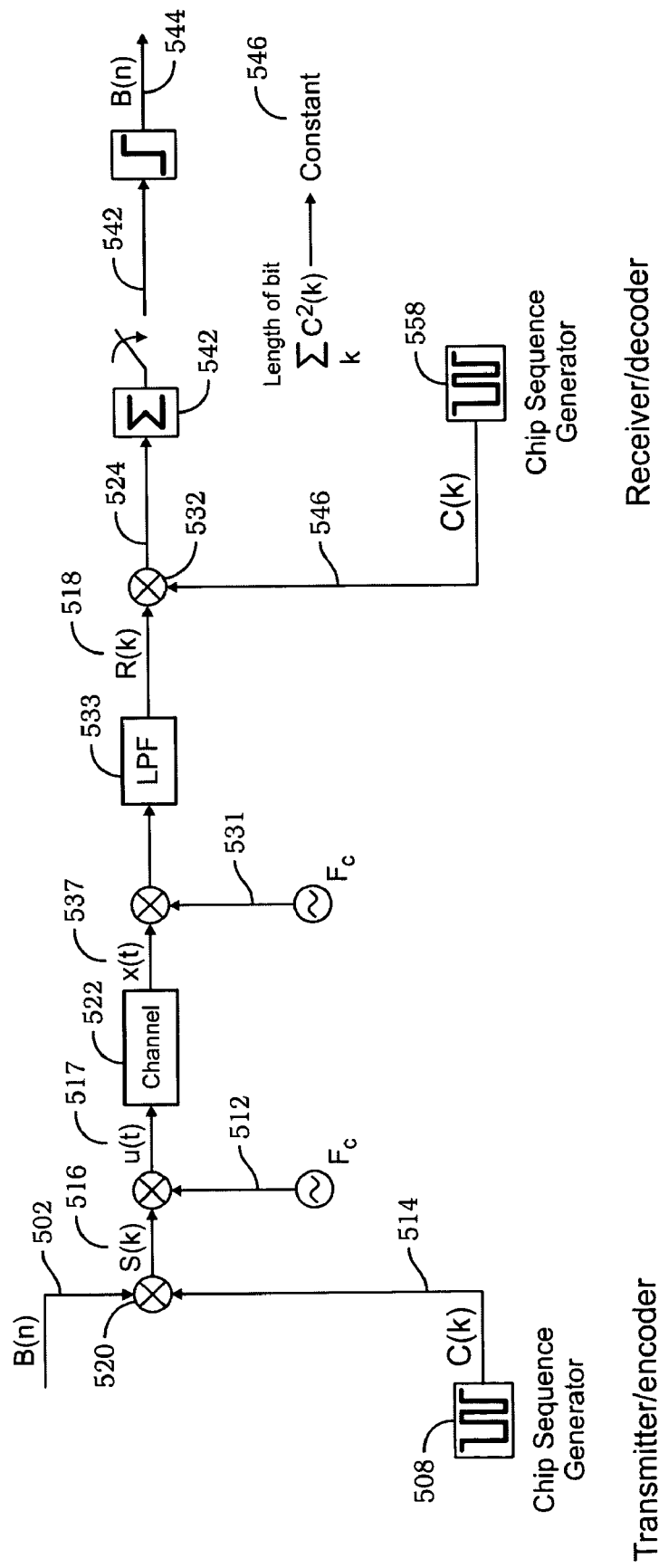
FIG. 5 shows a system with direct sequence spread spectrum encoder and decoder according to the present invention, assuming there is no distortion and noise in the communication channel.

FIG. 5 illustrates the direct spread spectrum encoding and decoding process according to a model used in the current invention, assuming there is no distortion and no noise in the communication channel. Bit stream B(n) 502 is XOR'ed at a combiner 520 with chip sequence C(k) 514 to become S(k) 516. Chip sequence C(k) 514 is generated by a chip sequence generator 508 as usual. Modulating signal S(k) 516 modulates the carrier signal $F_c$ 512 to form a signal 517 u(t). Then signal 517 u(t) is transmitted through a channel 522, for example a POTS line, to become a signal 537 x(t) to a receiver where signal 537 x(t) is demodulated by an identical carrier signal $F_c$ 531. The demodulated signal passes a low pass filter 533 and becomes a receiver signal R(k) 518. Receiver signal R(k) 518 is combined with chip sequence C(k) 546 at chip sequence decoder 532 to generate decoded signal 524. Chip sequence C(k) 546 and its generator 558 are identical to chip sequence C(k) 516 and its generator 508. Decoded signal 524 is further summed together to form signal 542, which removes the effect of the chip sequence C(k). As shown in equation 546, the contribution from the chip sequence, when they are added together, becomes a constant. By removing or normalizing that constant, signal 542 becomes signal 544, which is same as the original bit stream 502. More details are shown in a mathematic model discussed below.

Figure 6:
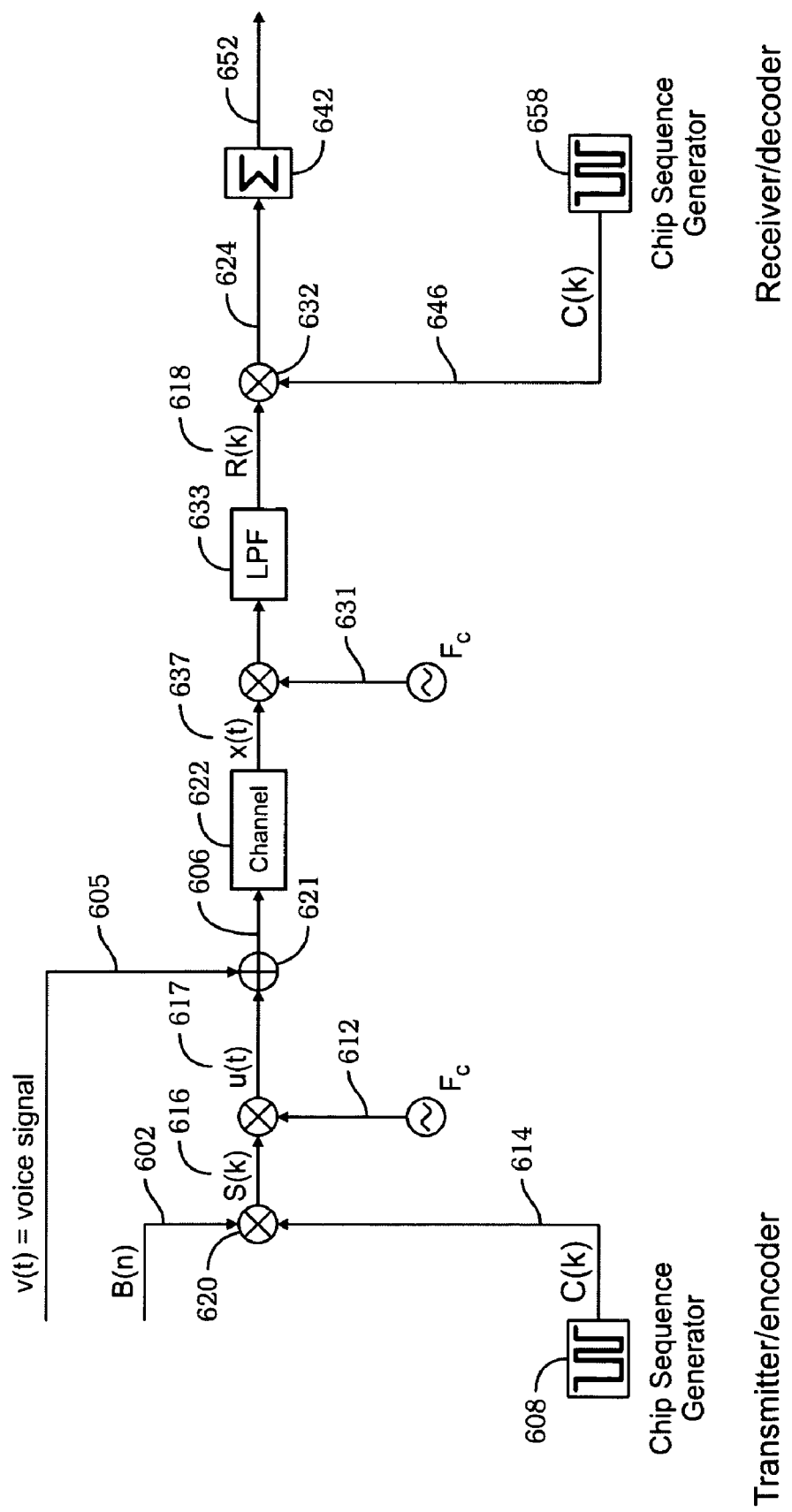
FIG. 6 illustrates the voice interference between the speech signal and the data signal according to the present invention, assuming there is no distortion and noise in the communication channel.

But this is not what actually happens in a real system, where digital data is transmitted together with an audio signal. FIG. 6 illustrates a more realistic system according to a model of the current invention, still assuming there is no distortion and noise in the communication channel. Most parts of the system shown in FIG. 6 are the same as in FIG. 5, for example, bit stream B(n) 602, chip sequence signals 614 and 646, chip sequence generators 608 and 658, combiner 620, channel 622, low pass filter 633, decoder 632 and combiner 642. The audio carrier signals $F_c$ 612 and $F_c$ 631 are modulated and demodulated after and before the combiner 620 and decoder 632 respectively. The additions in FIG. 6 include voice signal v(t) 605 and combiner 621 after the modulating the carrier signal $F_c$ 612 and before transmission through the channel 622. The new sender signal 606 is now a combination of signal S(k) 616 (which is similar to S(k) 516 in FIG. 5), the audio carrier signal 612 and voice signal 605. On the receiver side, signal x(t) 637 is demodulated by the audio carrier signal 631, similar to the process in FIG. 5. The receiver signal R(k) 618, which comes out of LPF 633, goes through the same decoding process, but the resulting signal 652 is not exactly the same as the original bit stream 602. Comparing to the result in FIG. 5, there is an additional term in decoded bit stream signal 652, which is a function of the voice signal v(t) and other signals. Depending on the size of this additional term, bit stream B(n), which is supposed to be −1 or +1, may be different. It is determined that this additional term, which is the result of the interference between voice signal 605 and modulated carrier signal u(t) 617, is responsible for most of the errors in the real system. The modulated carrier signal u(t) 617 is the combination of the bit stream 602, the chip sequence signal 614, and the carrier signal 612. With this source of the errors identified, the current invention includes methods and devices to eliminate such errors.

The audio carrier signal 617 is a combination of the bit stream 602, the chip sequence 614 and the audio carrier signal 612, all of which are known. Since the interference is only between modulated audio carrier signal 617 and audio signal 605, and both of which are known at the encoder within the transmitter, the amount of interference can be calculated and analyzed at the transmitter. When such interference is known at the transmitter, it is possible to remove such interference from the signal at the transmitter before the signal is transmitted to the receiver. Therefore when the receiver demodulates the signal, there is no interference contribution. After the receiver goes through the normal decoding process, the original bit stream can come out. This way, there will be no error theoretically due to the voice/data interference.

Figure 7:
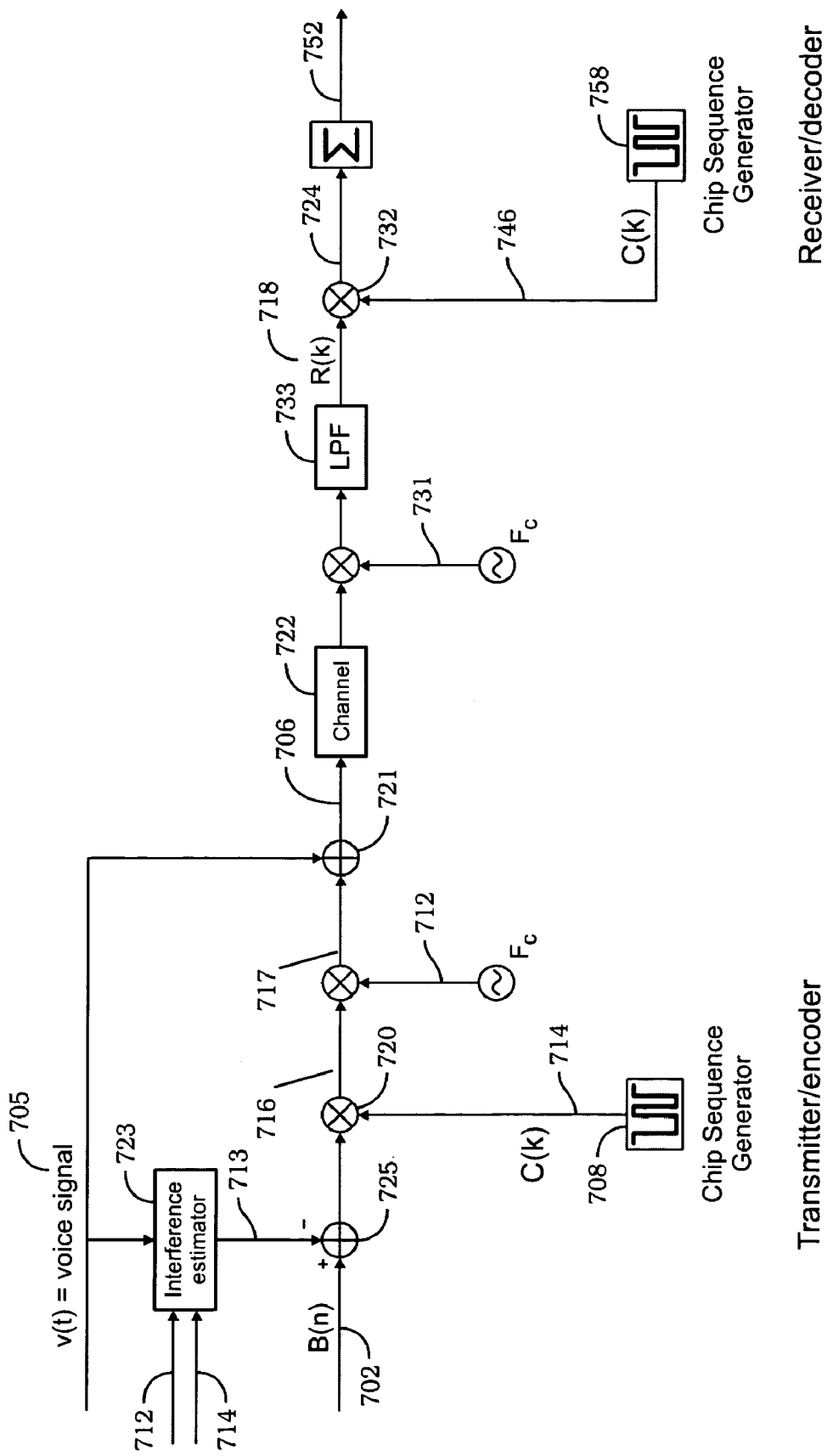
FIG. 7 shows a system with the voice interference remover according to the present invention.
Figure 8:
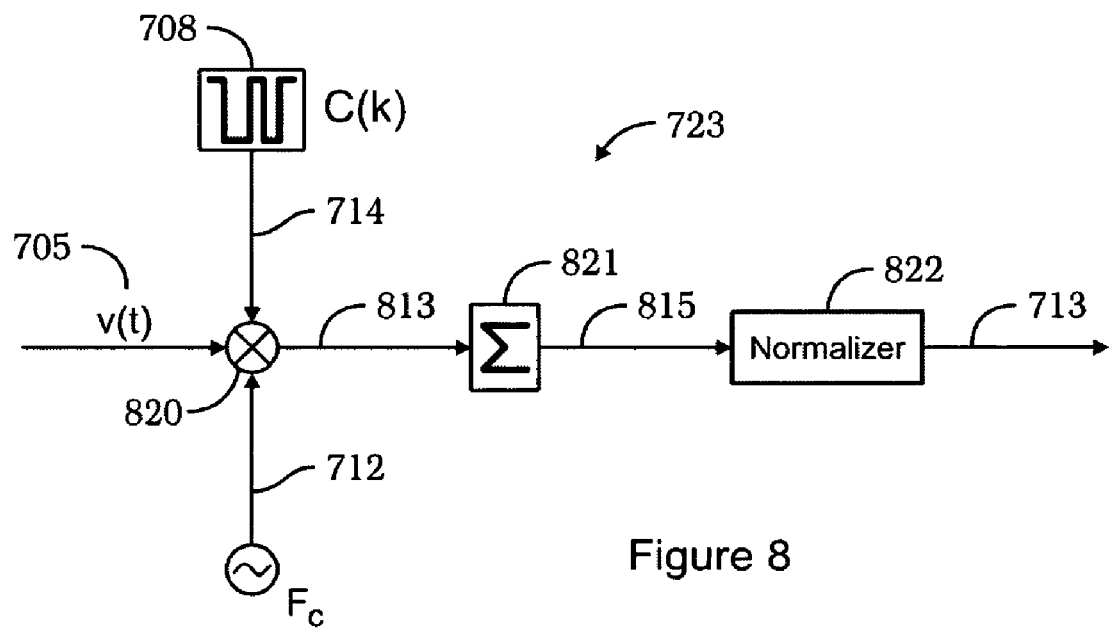
FIG. 8 shows the interference estimator of the system as illustrated in FIG. 7.

FIGS. 7 and 8 illustrate such a system that removes the data/voice interference. FIG. 7 shows a system where the voice interference is removed on the transmitter side. Voice signal 705 is analyzed and normalized. It is then combined with the chip sequence 714 and the audio carrier signal 712 to emulate the interference between the voice and the data signal at interference estimator 723. The resulting interference 713, which is between the voice and the digital stream, is subtracted from bit stream 702 at subtractor 725. The resulting signal, which is the bit stream minus the interference, is multiplied by chip sequence 714, to become signal S(k) 716, modulated by audio carrier signal 712 to become signal u(t) 717, and combined with voice signal 705 at combiner 721 in the same way as shown before in FIG. 6. Signal 706 is now interference-free. Such interference-free signal 706 can be transmitted through a channel 722 to a receiver. At the receiver, the interference-free signal 718 is demodulated, filtered (at LPF 733) and decoded as usual. The digital data 752 is interference-free and is the same as the original bit stream 702.

FIG. 8 illustrates more detail of interference estimator 723. The time-domain voice signal v(t) 705 is combined at modulator 820 with audio carrier signal 712 and chip sequence 714. The resulting signal 813 is summed by summer 821 to become signal 815. Signal 815 can then be normalized by normalizer 822 as signal 713, which is the estimated interference between voice signal 705, audio carrier signal 712 and chip sequence signal 714. The input signals are all known, i.e.

voice signal 705, audio carrier signal 712 and pseudo random chip sequence 714. A mathematical model discussed below describes more precisely the process to derive the output signal W(n) 713.

Figure 9:
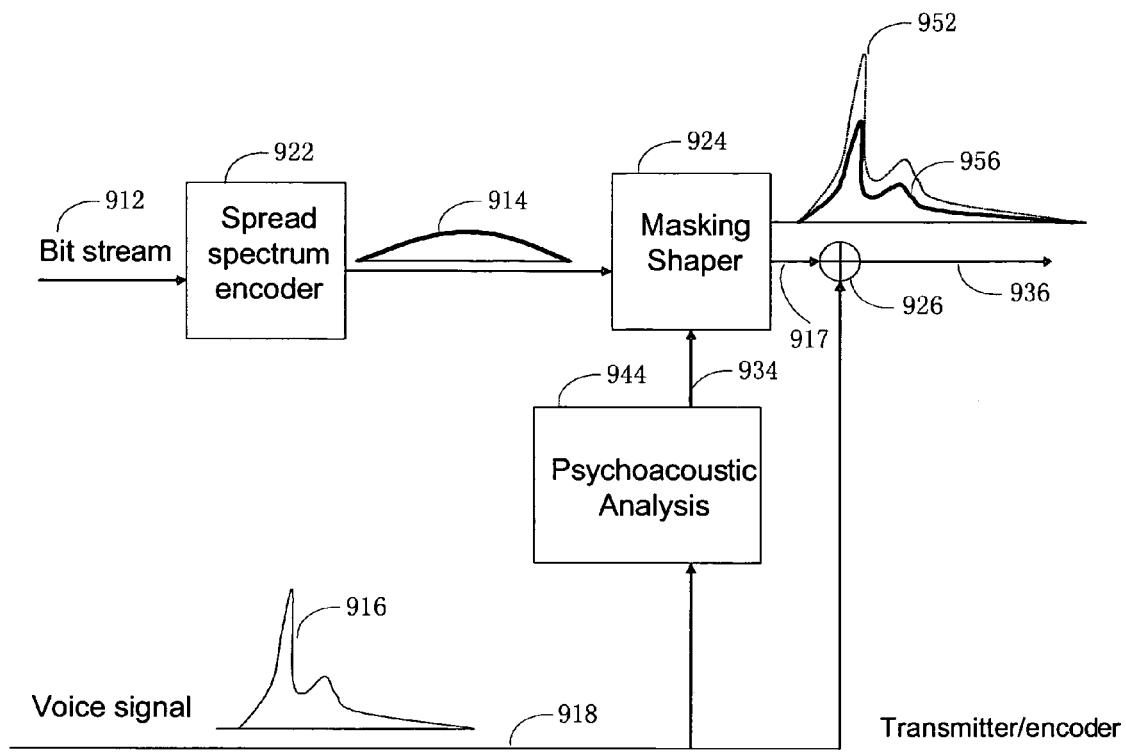
FIG. 9 shows a diagram for shaping signal for masking according to the present invention.
Figure 9:
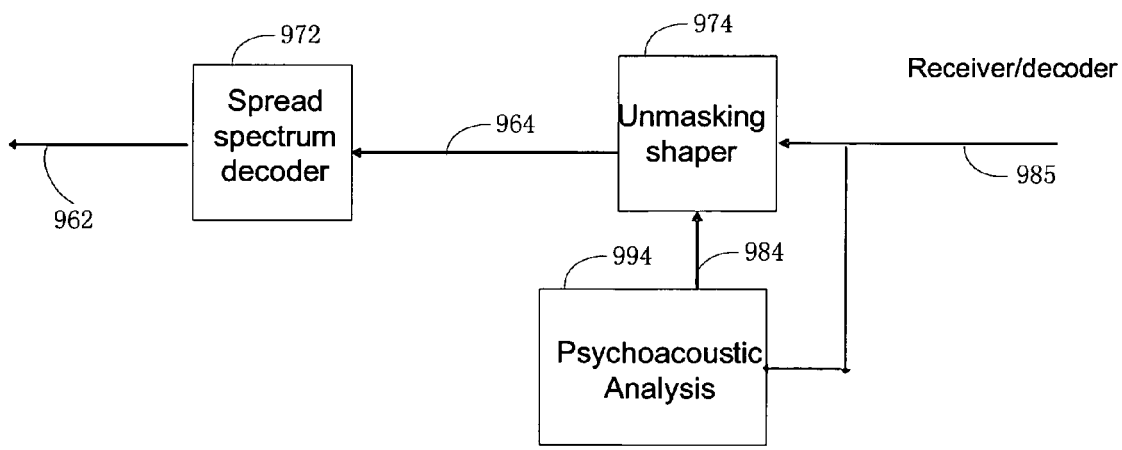

FIG. 9 shows another way to further reduce the perceived noise due to the digital data. It is well known that if the noise signal is underneath a main voice signal, i.e. the noise profile is the same as the speech profile, then even if the absolute energy of the noise is quite large, human ears may not perceive such a noise because of a masking effect of the larger energy of the voice signal. Such a masking effect can be used advantageously for digital data encoding. In the method shown in FIG. 9, bit stream 912 is encoded using one or more of the methods described above, including spread spectrum and interference removing etc. Encoded signal 914 has a normal distribution profile. But unlike the direct spread spectrum encoder as discussed in FIGS. 4 and 5, the signal is not used for transmission or combining with a speech voice yet. Speech signal 916 is sampled and analyzed by a psychoacoustic analyzer 944. The psychoacoustic analyzer extracts the voice signal profile and sends that profile 934 to a masking shaper 924. Knowing the real time voice signal profile that will be combined with the data bit stream modulated signal, masking shape 924 changes the profile of the audio carrier stream, such that the modulated carrier signal has the same profile as the voice signal as shown in 916. After the modulated audio carrier signal 917 and voice signal 918 are combined by an accumulator 926, the resulting signal becomes signal 936. As illustrated by profile 936, modulated audio carrier 956 is under real voice signal 952. This way, even if the carrier signal energy is quite large, the human ears cannot distinguish it from the speech signal, i.e. there is no noise.

On the receiver side, the process is the same process as on the transmitter/encoder side, except in a reversed order. Another psychoacoustic analyzer 994 is used to extract voice signal profile 984 from received signal 985. With this voice signal profile 984, a masking un-shaper 974, which is the reverse of masking shaper 924, can un-shape modulated audio carrier signal 985 back to the normal profile. Unmasked modulated audio carrier signal 964 may then go through the same process as shown in FIG. 7 to extract the bit stream. Eventually, bit stream 962, which should be the same as original bit stream 912 can be recovered.

Figure 10A:
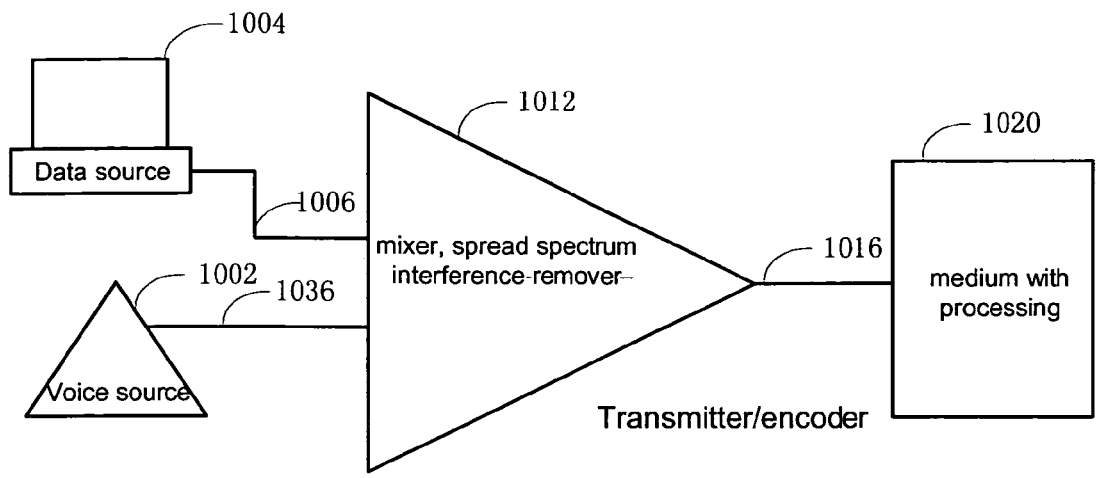
FIGS. 10a, 10b and 10c show some application systems implementing the current invention.
Figure 10B:
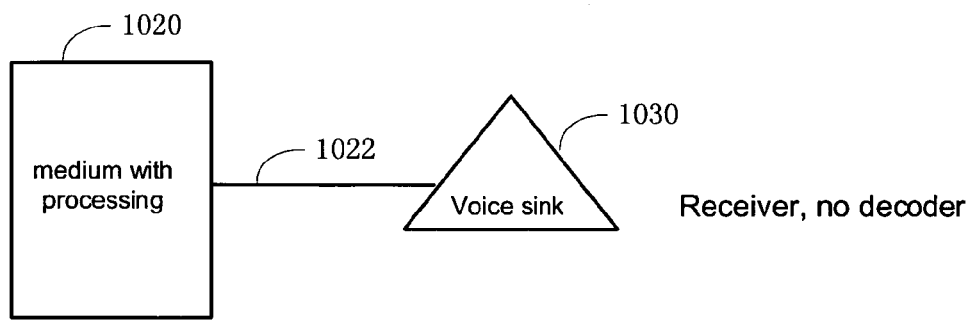
Figure 10C:
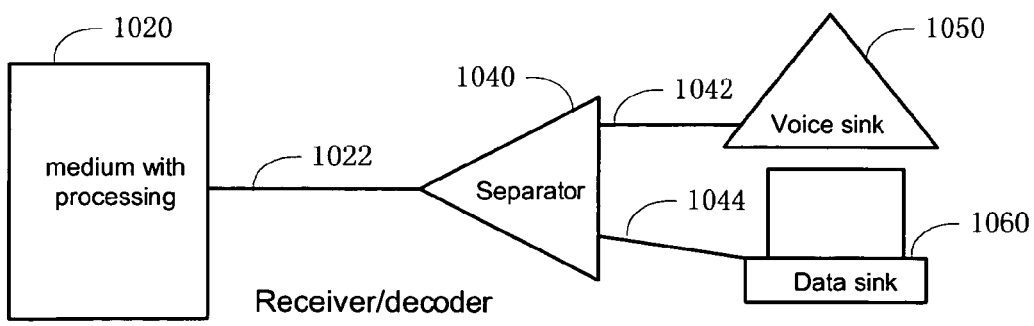

FIGS. 10a, 10b and 10c show some application systems using the current invention. FIG. 10a is the encoding part that implements the current invention. FIG. 10b is one decoding implementation that does not know or use the current invention. FIG. 10c is one decoding implementation that does make use of the current invention.

Figure 1:
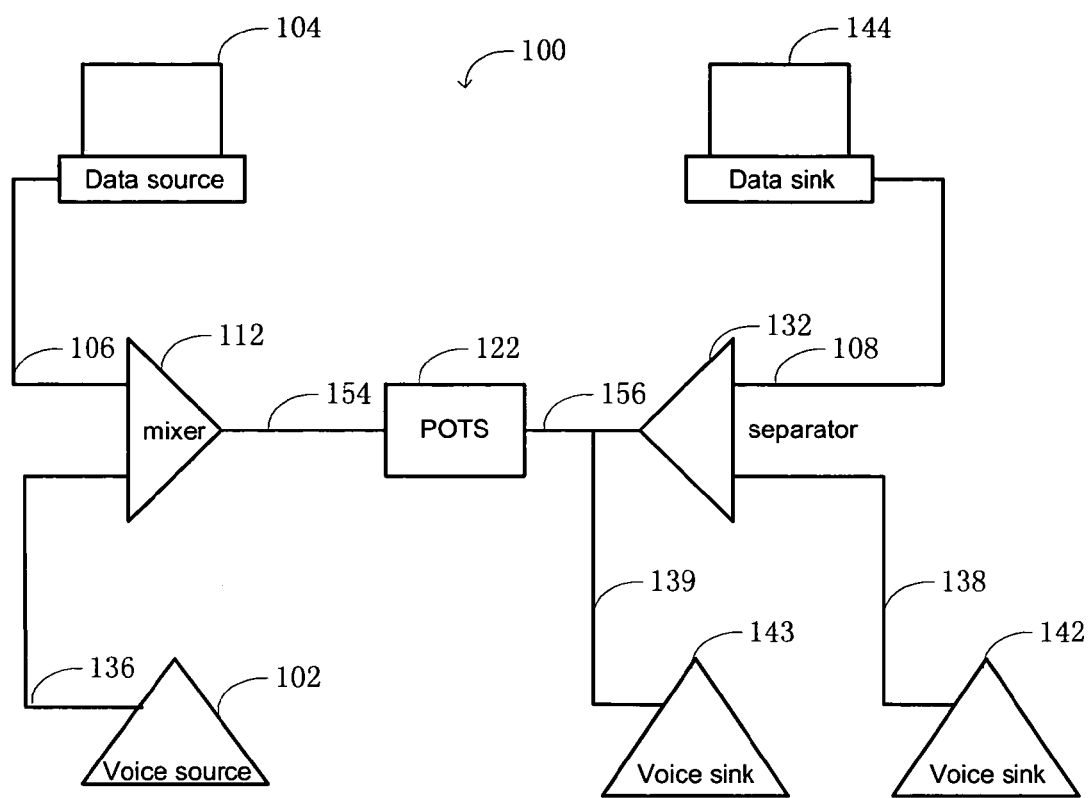
FIG. 1 shows a typical prior art system which can transmit speech signal and data signal at the same time.

The encoding part as shown in FIG. 10a is similar to the transmission side of the system shown in FIG. 1. Data source 1004 sends data 1006 and voice source 1002 send its voice signal 1036 to a signal processor 1012. Signal processor 1012 combines the two signals and forms a signal audio signal 1016. In making audio signal 1016, processor 1012 employs the spread spectrum method and the voice-data interference remover discussed above. Mixed audio signal 1016 is stored in some medium 1020. Medium 1020 may also have some further processing before it transfers audio signal 1016. Medium 1020 can be any medium that can carry the audio signal, permanently or temporarily. For example, medium 1020 can be an analog audio tape which records audio signal 1016 with a magnetic tape. Medium 1020 can be analog audio broadcast that transmits audio signal 1016 using radio waves. The radio wave is a transient or temporary carrier, but it can be easily converted into permanent medium by radio receivers. Medium 1020 can also be an audio CD or a hard-drive.

Medium 1020 can be reproduced by different devices or methods. FIG. 10b shows a regular audio system, or a voice sink 1030 that reproduces audio signal 1022. Even though the audio signal has data 1006 embedded in it, as far as voice sink 1030 is concerned, data 1006 does not exist, or is just background noise. Voice sink 1030 reproduces mixed audio signal 1022 together with data 1006. To a human listener who hears the mixed audio with data, the data is unperceivable. So only audio signal is perceived. Since data 1006 is embedded in the audio signal, it is not affected by any audio signal processing. As long as audio signal 1022 is intact, data 1006 is intact.

If an audio receiver has a proper separator, as shown in FIG. 10c, then embedded data 1006 can be retrieved from mixed audio signal 1022. As shown in FIG. 10c, the mixed audio signal is received by separator 1040, which has a matching processor that can separate the mixed audio signal and data signal.

Pure audio signal 1042 is sent to a voice sink 1050 and data 1044 is sent to a data sink 1060. Audio signal 1042 is data free. Data signal 1044 can be recovered and be used as intended.

The audio signal with embedded data has many different applications. One application could be intellectual property management. Since the digital data are embedded as an audio signal within the regular analog audio (e.g. music), they are unperceived by human listeners. The mixed audio signals are not affected by the usual digital or analog processing of the music in a codec and other processors, as long as the regular audio stream can be reproduced. So if a copyrighted song is embedded with copyright information, authorized seller's information (and even buyer's information), then such information is with the song even if it is copied without authorization many times. If a copy of such song is played, a receiver with an appropriate separator may listen to the song and retrieves the embedded data, if any. If there are embedded data in the song, then one can know who the author, or original seller (or buyer) is. If the person possesses the song is not the original buyer, then he may have received the song without authorization.

Mathematical Models

The embodiments of the current invention may also be described by the following mathematical models with more accuracy.

Modulation and Demodulation

Referring to FIG. 2, let S(k) be the bit stream signal to be modulated and sent. In our case, S(k) is a sequence of 1 and −1 indexed by k. That is: $S(k) \in \{-1, 1\}$ for all $k \in \mathbb{Z}$. $\mathbb{Z}$ is the set of all integers, including positive integers, zero and negative integers.

Continuous time is represented by t. That is: $t \in \mathbb{R}$. $\mathbb{R}$ is the set of all real numbers.

The index k is sampled in time running at a period of $T_c$. Here $T_c$ is bounded to satisfy the Nyquist criteria. For a given index k, we can compute t as follows:

$$t = kT_c \text{ for all } k \in \mathbb{Z}$$

The inverse is computed as: $k = \lfloor t/T_c \rfloor$ for all $t \in \mathbb{R}$, Where $\lfloor \cdot \rfloor$ is the floor operator, which returns the largest integer that is less than the operand. In a practical system, S(k) will only be defined over a finite set of consecutive indices and therefore t will only span a finite time, but one can safely generalize to all time without affecting the results.

Let us modulate by multiplying S(k) by a carrier tone: $u(t) = 2S(\lfloor t/T_c \rfloor)\cos(2\pi f_c t)$, where $f_c$ is a real positive carrier frequency. u(t) is the modulated audio carrier signal that is transmitted. The received signal is x(t).

For a noise free situation: assuming that we get x(t) in the receiver with no noise, as shown in FIG. 5. On the receiver side we will demodulate x(t) to compute R(k). Assuming that LPF[ ] is a Low Pass Filter operator, we get:

$$R(k) = LPF[x(t)\cos(2\pi f_c t)]$$
$$= LPF[2S(\lfloor t/T_c \rfloor)\cos^2(2\pi f_c t)]$$
$$= LPF[S(\lfloor t/T_c \rfloor)(1 + \cos(4\pi f_c t))]$$
$$= S(k)$$

Note that R(k)=S(k). So we can recover what we had encoded, i.e. the modulation and demodulation works. As shown in FIG. 5, signal R(k) 518 and signal S(k) 516 are the same. In a noise free condition, the modulation/demodulation introduces no theoretical error.

Shaping Signal for Masking

Now we define a pair of filters. The Masking Shaping Filter is designed to shape the spectrum of u(t) to give an acoustically less perceptible sound to x(t).

$$x(t)=MSF[u(t)]$$

Here MSF is the Masking Shaping Filter operator. We define the inverse filter called Masking Unshaping Filter. It has an operator of USF[•]. The inverse property ideally guarantees.

$$u(t)=USF[MSF[u(t)]]$$

Chip Sequence

Let us define a chip sequence p(k) as follows:

p(k)∈{−1, 1} only defined for indices k∈{1, 2, 3, ... L}.

Now we define a periodic chip pattern C(k)

$$C(k)=p((k-1)\bmod L)+1) \text{ for all } k \in \mathbb{Z}$$

That is $$C(k+nL)=p(k) \text{ for all } n \in \mathbb{Z} \text{ and } k \in \{1, 2, 3, \dots L\}.$$

The chip sequence pattern is designed with two criteria $$\Sigma_{k=1,2,\dots L}C(k)C(k)=L, \quad \text{(chip sequence condition 1)}$$

and we minimize the offset correlation (ideally, it is zero)

$$\Sigma_{k=1,2,\dots L}C(k)C(k+m) \text{ for } m\neq 0 \text{ and } m<k \text{ (chip sequence condition 2)}$$

The length of the chip sequence is a design choice, which is typically between 10 to about 50. A longer chip sequence is preferred, which can provide more benefits of spectrum spreading. But more spreading requires more bandwidth in the audio stream, which is typically limited by the audio stream.

Modulation/Demodulation with Chip Sequence

When we have a bit sequence we wish to transmit, we map the bit sequence to a pattern of +1 or −1, instead of +1 and 0, i.e. replace the 0 with −1. This becomes B(n). B(n)∈{−1, 1} for all n∈ℤ.

The index n is bit time running at a period of $T_b$. We set the period such that $T_b=L\,T_c$.

We may compute the synchronous chip time k from the bit time n with the relationship k=nL. The inverse is computed as: $n=\lfloor k/L \rfloor$.

We can now define how we generate S(k) from the bit sequence:

$$S(k)=C(k)B(\lfloor k/L \rfloor).$$

On the receiver side after demodulation we find, R(k)=S(k)=C(k)B(⌊k/L⌋)

We now multiply by the chip sequence pattern one more time.

$$C(k)R(k)=C^2(k)B(\lfloor k/L \rfloor)$$

Note that since C(k)∈{−1, 1} then $C^2(k)$=1 such that C(k)R(k)=B(⌊k/L⌋). The original bit stream is recovered. Again, with chip sequencing, the modulation/demodulation still works fine. So signal B(n) 544 is the same as signal B(n) 502 as shown in FIG. 5.

Modulation/Demodulation with Noise

In a more realistic system, there are random noises. But on average, random noises tend to average out. We do this with a summation.

$$G(n) = \sum_{k=1,2,\dots L} C(k+nL)R(k+nL)$$
$$= \sum_{k=1,2,\dots L} B(\lfloor (k+nL)/L \rfloor)$$
$$= LB(n) \quad \text{for all } n \in Z \text{ and } k \in \{1, 2, 3, \dots L\}.$$

The gain factor L is just a scaling factor. We can recover B(n) by looking at the sign of G(n)B'(n)=sign(G(n))=sign(LB(n))

In the absence of noise, B'(n)=B(n) always. So adding random noises in the model, the modulation/demodulation still works as desired.

With Voice/Data Interference

When considering the interaction between the voice signal and the data signal, the situation is different. When we add voice to the channel, we transmit a modified x(t) given by:

x(t)=MSF[u(t)]+v(t), Where v(t) is the voice signal that is being mixed with the data.

Spread Spectrum Decoding with Voice

When we transmit the data with voice signal, the demodulator on the receiver side will have a second term which is a function of voice.

$$R(k) = LPF[USF[x(t) + v(t)]\cos(2\pi f_c t)]$$
$$= LPF[2S(\lfloor t/T_c \rfloor)\cos^2(2\pi f_c t) + USF[v(t)]\cos(2\pi f_c t)]$$
$$= LPF[S(\lfloor t/T_c \rfloor)(1 + \cos(4\pi f_c t)) + USF[v(t)]\cos(2\pi f_c t)]$$
$$= S(k) + LPF[USF[v(t)]\cos(2\pi f_c t)]$$
$$= S(k) + V(k)$$

where $$V(k) = LPF[USF[v(t)]\cos(2\pi f_c t)] \quad \text{(discrete voice equation.)}$$

This confirms the discussion in reference to FIG. 6. Signal R(k) 618 is now a function of the voice signal v(t) 605 also. The voice signal v(t) may be expressed in discrete domain signal V(k), as shown above. The voice signal v(t) (or V(k)) creates an interference in the receiver. In the receiver we multiply by the chip sequence pattern.

$$C(k)R(k) = C(k)S(k) + C(k)V(k)$$
$$= C^2(k)B(\lfloor k/L \rfloor) + C(k)V(k)$$
$$= B(\lfloor k/L \rfloor) + C(k)V(k)$$

We do the summation.

$$G(n) = \sum_{k=1,2,\ldots L} C(k+nL)R(k+nL)$$

$$= \sum_{k=1,2,\ldots L} B(\lfloor(k+nL)/L\rfloor) + \sum_{k=1,2,\ldots L} C(k+nL)V(k+nL)$$

$$= LB(n) + \sum_{k=1,2,\ldots L} C(k+nL)V(k+nL)$$

$$= LB(n) + W(n) \text{ for all } n \in Z \text{ and } k \in \{1, 2, 3, \ldots L\}.$$

where $$W(n) = \sum_{k=1,2,\ldots L} C(k+nL)V(k+nL)$$

("voice interference equation")

We try to recover B(n) by looking at the sign of G(n), $$B'(n) = \text{sign}(G(n)) = \text{sign}(LB(n) + W(n))$$

Signal G(n) 652 is a resulting signal after all the signal processing as shown in FIG. 6. W(n) is a voice interference in the recovered bit stream. We will have an error if W(n) is large enough to change the sign of sign(L B(n)).

This is the problem of the voice interference discovered by the current invention. When the interference term is sizeable relative to the modulated digital signal, the digital signal may be corrupted and unrecoverable by the decoder, i.e. Prob(Bit Error)≧Prob(W(n)>sign(L B(n))). Since this interference depends on the profile and amplitude of the voice signal, in certain situations, the interference is small and the bit error rate is small. Only when the correlation between the voice signal and the chip sequence is large, the interference is large and causing more errors. Due to the randomness of the chip sequence, the voice signal and their correlation, the error rate in the transmitted data is inconsistent and erratic. Due to the inconsistent error rates, it is very hard to overcome the error problem before the current invention. As discussed above, the errors are not due to the random noise in the audio channel, so making audio channel clearer, i.e. with less noise, does not help with the digital data transmission. To increase the energy of the audio carrier signal (the B(n) term) relative the regular voice signal does improved digital data transmission, but that can make the perceived noise in the regular voice noticeable and defeat the original purpose, i.e. transmitting digital data without disturbing the regular voice signal. Before the current invention, it was generally accepted that there will be transmission errors in a system which transmits digital data within an audio channel. The accepted error rate may be as high as 10% of all digital data transmitted. Other methods are employed to eventually correct the errors, for example using repeat data transmission when error occurs, or using error correcting coding etc.

Once the nature and source of the errors occurred in a digital data transmission in an audio stream are identified by the current invention, a method or a device to correct them can be designed. By reducing or eliminating this interference, the bit errors are substantially reduced or eliminated.

With Interference Remover

Since the interference is between the voice signal and the modulated carrier signal, both of which are known, the interference W(n) can be calculated according to the voice interference equation, which in turn uses the discrete voice equation. This is done in an interference estimator 723 as shown in FIGS. 7 and 8. As discussed in the modulation/demodulation section, the modulation/demodulation does not change signal properties. For mathematical simplicity, the following derivation is shown in discrete domain. In the transmitter, let us compute W(n) as defined in the voice interference equation and let us replace B(n) with B(n)−W(n)/L. Then we have:

$$S(k) = C(k)(B(\lfloor k/L \rfloor) - W(\lfloor k/L \rfloor)/L)$$

and at the receiver side, R(k)=S(k)+V(k), where (V(k) is the voice signal as defined above.

Now in the receiver we multiply by the chip sequence pattern:

$$C(k)R(k) = C(k)S(k) + C(k)V(k)$$

$$= C^2(k)(B(\lfloor k/L \rfloor) - W(\lfloor k/L \rfloor)/L) + C(k)V(k)$$

$$= (B(\lfloor k/L \rfloor) - W(\lfloor k/L \rfloor)/L) + C(k)V(k)$$

We next do the summation.

$$G(n) = \sum_{k=1,2,\ldots L} C(k+nL)R(k+nL)$$

$$= \sum_{k=1,2,\ldots L} B(\lfloor(k+nL)/L\rfloor) - \sum_{k=1,2,\ldots L} W(\lfloor(k+nL)/L\rfloor)/L +$$

$$\sum_{k=1,2,\ldots L} C(k+nL)V(k+nL)$$

$$= LB(n) - W(n) + \sum_{k=1,2,\ldots L} C(k+nL)V(k+nL)$$

$$= LB(n) - W(n) + W(n)$$

$$= LB(n)$$

Note that the output is not a function of the voice signal anymore. If there is noise, then we can try to recover B(n) by looking at the sign of G(n)

$$B'(n) = \text{sign}(G(n)) = \text{sign}(LB(n))$$

So we can get the original bit stream B(n) back.

The current invention identifies the nature and source of the errors in a digital data transmission system where the data is transmitted within an audio channel. The current invention determines that the main source of errors is the interference of the modulated carrier audio signal and the regular audio signal within the audio channel. By calculating and subtracting the interference from the modulated carrier audio signal, the resulting signal can be interference free. When the receiver demodulates the combined modulated audio carrier signal and the audio signal, the original digital data can be obtained without interference, or error free. To further improve the perceived audio quality of the regular audio stream, other methods, such as spread spectrum coding, profile masking may also be used.

In the current application, speech signal or voice signal refers to the audio signal in an audio system, which is the designed to process such audio signal. The speech signal or voice signal is not necessarily human speech. It can also be any audio signal or sound. The bit stream or digital data refers to any digital data embedded in or added to the audio signal.

While illustrative embodiments of the invention have been illustrated and described, it will be appreciated that various changes can be made therein without departing from the spirit and scope of the invention.

I claim:

1. A method for reducing bit stream errors in an audio system, wherein a bit stream modulates a chip sequence and an audio carrier signal to form a modulated signal, wherein the modulated signal is embedded in an audio signal, the method comprising:
    calculating an interference among the audio signal, the chip sequence and the audio carrier signal;
    subtracting the interference from the bit stream prior to modulating the chip sequence and the audio carrier signal; and
    summing the audio signal and the modulated signal.

2. A method for embedding a bit stream in an audio stream in an audio system, the method comprising:
    calculating an interference between the audio stream and a combination of an audio carrier signal and a chip sequence;
    forming a modulated signal to represent the bit stream by subtracting the interference from the bit stream prior to using the bit stream to modulate the combination of the audio carrier signal and the chip sequence; and
    summing the audio stream and the modulated signal to form a mixed signal.

3. The method of claim 2,
    wherein modulating the audio carrier signal to represent the bit stream, the modulation method is a phase shifting keying method.

4. The method of claim 2,
    wherein modulating the audio carrier signal to represent the bit stream includes direct spread spectrum.

5. The method of claim 2, further comprising:
    obtaining the spectra profile of the audio stream; and
    shaping the audio carrier signal according to the audio stream profile before the audio carrier signal is modulated by the bit stream.

6. The method of claim 5, further comprising:
    unshaping the mixed signal to normal profile before demodulating the mixed signal; and
    demodulating the mixed signal to retrieve the bit stream.

7. The method of claim 2, further comprising:
    demodulating the mixed signal to retrieve the bit stream.

8. A signal processor for an audio system, the processor comprising:
    a processing module operable for,
    calculating an interference between an audio signal, a chip sequence, and an audio carrier signal;
    subtracting the interference from a bit stream prior to using the bit stream to modulate the chip sequence and the audio carrier signal to form a modulated signal to represent the bit stream, wherein the modulated signal is embedded in the audio signal; and
    summing the audio signal and the modulated signal to form a mixed signal.

9. The signal processor of claim 8,
    wherein modulating the audio carrier signal to represent the bit stream, the modulation method is a phase shifting keying method.

10. The signal processor of claim 8,
    wherein modulating the audio carrier signal to represent the bit stream includes direct spread spectrum.

11. The signal processor of claim 8, wherein the processing module is further operable for:
    obtaining the spectra profile of the audio signal; and
    shaping the audio carrier signal according to the audio signal profile before the audio carrier signal is modulated by the bit stream.

12. The signal processor of claim 11, wherein the processing module is further operable for:
    unshaping the mixed signal to normal profile before demodulating the mixed signal; and
    demodulating the mixed signal to retrieve the bit stream.

13. The signal processor of claim 8, wherein the processing module is further operable for:
    demodulating the mixed signal to retrieve the bit stream.

14. An audio system, comprising:
    a microphone; and
    a processing module coupled to the microphone, wherein the processing module is operable for:
    receiving a bit stream;
    calculating an interference between an audio signal, a chip sequence, and an audio carrier signal;
    subtracting the interference from the bit stream prior to using the bit stream to modulate the chip sequence and the audio carrier signal to form a modulated signal to represent the bit stream, wherein the modulated signal is embedded in the audio signal; and
    summing the audio signal and the modulated signal to form a mixed signal.

15. The audio system of claim 14,
    wherein modulating the audio carrier signal to represent the bit stream, the modulation method is a phase shifting keying method.

16. The audio system of claim 14,
    wherein modulating the audio carrier signal to represent the bit stream includes direct spread spectrum.

17. The audio system of claim 14, wherein the processing module is operable for:
    obtaining the spectra profile of the audio signal; and
    shaping the audio carrier signal according to the audio signal profile before the audio carrier signal is modulated by the bit stream.

18. The audio system of claim 17, wherein the processing module is operable for:
    unshaping the mixed signal to normal profile before demodulating the mixed signal; and
    demodulating the mixed signal to retrieve the bit stream.

19. The audio system of claim 14, wherein the processing module is operable for:
    demodulating the mixed signal to retrieve the bit stream.

20. The audio system of 14, further comprising:
    a network interface coupled the process module.

21. The audio system of 20,
    wherein the network interface is operable to connect to a Plain Old Telephone Service (POTS) network.

22. The audio system of 20,
    wherein the network interface is operable to connect to a radio that broadcasts the mix signal.

23. The audio system of 20,
    wherein the network interface is operable to record the mixed signal in a medium.

* * * * *